United States Patent
Anderson et al.

(10) Patent No.: US 7,158,499 B2
(45) Date of Patent: Jan. 2, 2007

(54) VOICE-OPERATED TWO-WAY ASYNCHRONOUS RADIO

(75) Inventors: David B. Anderson, Belmont, MA (US); Emily Anderson, Belmont, MA (US); Barry Perlman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 820 days.

(21) Appl. No.: 09/955,696

(22) Filed: Sep. 19, 2001

(65) Prior Publication Data

US 2003/0060181 A1    Mar. 27, 2003

(51) Int. Cl.
- H04L 12/28 (2006.01)
- H04J 3/24 (2006.01)
- H04M 11/00 (2006.01)
- H04Q 7/24 (2006.01)

(52) U.S. Cl. ............ 370/338; 370/349; 370/389; 379/88; 455/74; 455/313

(58) Field of Classification Search ........ 370/286–313, 370/338–349, 534, 907, 240–270, 351–389; 704/251–260, 236–242; 709/202–219; 455/74, 455/313–410, 413–563; 379/88.01, 88.02
See application file for complete search history.

(56) References Cited

U.S. PATENT DOCUMENTS

| | | | |
|---|---|---|---|
| 4,860,359 A | 8/1989 | Eicher | 381/46 |
| 5,008,954 A | 4/1991 | Oppendahl | 455/79 |
| 5,042,063 A | 8/1991 | Sakanishi et al. | 379/88 |
| 5,109,525 A * | 4/1992 | Nichols | 455/74 |
| 5,125,024 A * | 6/1992 | Gokcen et al. | 379/88.01 |
| 5,263,181 A * | 11/1993 | Reed | 455/152.1 |
| 5,267,323 A * | 11/1993 | Kimura | 381/110 |
| 5,584,052 A | 12/1996 | Gulan et al. | 455/79 |
| 5,802,467 A * | 9/1998 | Salazar et al. | 455/420 |
| 6,010,216 A | 1/2000 | Jesiek | 351/158 |
| 6,184,796 B1 * | 2/2001 | Rivero et al. | 340/407.1 |
| 6,212,408 B1 * | 4/2001 | Son et al. | 455/563 |
| 6,236,969 B1 * | 5/2001 | Ruppert et al. | 704/275 |
| 6,532,446 B1 * | 3/2003 | King | 704/270.1 |
| 6,826,647 B1 * | 11/2004 | Leyman | 710/317 |
| 6,865,532 B1 * | 3/2005 | Anderson | 704/257 |
| 6,931,104 B1 * | 8/2005 | Foster et al. | 379/88.02 |
| 2002/0044633 A1 * | 4/2002 | Nabha et al. | 379/90.01 |
| 2002/0072914 A1 * | 6/2002 | Alshawi et al. | 704/270.1 |
| 2002/0099795 A1 * | 7/2002 | Betros et al. | 709/219 |
| 2002/0122541 A1 * | 9/2002 | Metcalf | 379/88.02 |
| 2003/0028380 A1 * | 2/2003 | Freeland et al. | 704/260 |
| 2003/0110034 A1 * | 6/2003 | Runge et al. | 704/246 |
| 2004/0128137 A1 * | 7/2004 | Bush et al. | 704/275 |

* cited by examiner

*Primary Examiner*—Man U. Phan
(74) *Attorney, Agent, or Firm*—Dirk Brinkman; Clifton D. Mueller; Gene V. Vinokur

(57) ABSTRACT

A method and apparatus for communicating audio messages uses a two-way radio. An output audio message is asynchronously transmitted by generating a first acoustic signal in an input device of the radio. A determination is made whether the first acoustic signal is a command. If the acoustic signal is a command, then a response is generated in an output device, and the command is processed. Otherwise, the first acoustic signal is stored in an output buffer and then later sent as an output audio message only when a communications channel is available. An input audio message is asynchronously received in a receiver of the radio, and then stored in an input buffer. A second acoustic signal is generated which causes the stored input audio message to be sent to the output device only if the second acoustic signal is a play command.

13 Claims, 6 Drawing Sheets

VOICE-OPERATED TWO-WAY ASYNCHRONOUS RADIO

FIELD OF THE INVENTION

This invention relates generally to voice operated communication devices, and more particularly to two-way asynchronous transceivers.

BACKGROUND OF THE INVENTION

A number of radio communication modes are known. Simple two-way radio communications primarily use a simplex synchronous channel. This means that a single channel (frequency) is used, and a user can either send (speak) or receive (hear), but not both at the same time. In either case, whether the user is acting as a sender or a receiver, the sending and receiving of the signal occurred substantially simultaneously at both ends of the channel. Hence the communication is said to be synchronous. Common embodiments of such two-way synchronous radios are typically operated by depressing the "talk" button on the microphone. Of course, if both users depress their talk buttons at the same, then neither user hears anything.

A more modern version of such a two-way radio uses a duplex synchronous channel. In this case, both users can send and receive at the same time, and each user hears the other user's words as they are spoken. The most common form of this type of radio is the ubiquitous cellular telephone.

A characteristic of synchronous communication devices is that both the transmitter and receiver must be connected to the channel for the entire time that the communications occur. This is a problem in heavily populated urban areas where the number of available channels is much smaller than the number of potential users. In addition, cellular telephones requires a large number of buttons, and a display. This makes it difficult and distracting to operate the device. In addition, many users may desire to receive communications only at times selected by them, not at the times selected by senders.

Another problem with voice operated devices is to correctly recognize numbers, such as spoken telephone numbers, especially in the case that the identifier is in the form of large sequence of numbers, such as a security code or an account code much may well run twenty digits long.

One-way asynchronous communications devices have been available in the form of pagers. Typically, such devices can only passively receive and display simple textual messages such as telephone numbers of calling numbers. In most cases, a service provider is required to connect the pagers to standard telephone networks.

U.S. Pat. No. 4,860,359 issued to Eicher on Aug. 22, 1989 "Method of voice operated transmit control," described a voice activated audio transmission system. There, an input signal was compared with an anti-VOX signal. As soon as a voice was detected, the voice signal was coupled for synchronous transmission.

U.S. Pat. No. 5,008,954 issued to Oppendahl on Apr. 16, 1991 "Voice-activated radio transceiver," described a voice-activated transceiver that provided audio tones through earphones of the transceiver to announce the transition to and from transmit mode. By listening for the tones, the user was continuously apprised of the status of the transceiver.

U.S. Pat. No. 5,042,063 issued Sakanishi, et al. on Aug. 20, 1991 "Telephone apparatus with voice activated dialing function," described a telephone in which a call could be placed by either dialing or speaking telephone numbers.

U.S. Pat. No. 5,584,052 issued to Gulau, et al. on Dec. 10, 1996 "Integrated microphone/pushbutton housing for voice activated cellular phone," described a voice controlled vehicle accessory system responsive to voice commands and manual commands. Manual commands were entered via a single pushbutton having multiple functions depending upon an instantaneous state of a system controller. Predetermined voice commands were entered via a microphone. The types of accessories that could be coupled to the controller included the car throttle, audio system, climate system, and a cellular telephone.

U.S. Pat. No. 6,010,216 issued to Jesiek on Jan. 4, 2000 "'Hear speak' two way voice radio communications eyeglasses," described a radio transceiver incorporated into eyeglasses. The transceiver included a voice activated switch to switch between receive and transmit mode.

U.S. Pat. No. 6,212,408 issued to Son, et al. on Apr. 3, 2001 "Voice command system and method," described a system that allowed a communication device to accept voice commands from a user. The voice commands included commands to execute or dial key sequences or commands to control device functionality. Voice commands were received from a user of the communication device, indicating a command to be carried out by said communication device. Manual entry could be requested by the user in response to button activity or by a spoken command.

U.S. Pat. No. 6,236,969 issued to Ruppert, et al. on May 22, 2001 "Wearable telecommunications apparatus with voice/speech control features," described a wearable communication apparatus in the form of a self-contained telephone headset. The headset could be activated by rotation of the mouthpiece into an operative position and deactivated by rotation out of that position. The base could be connected to a telephone network via a traditional landline, and communicate with the headset via an RF antenna. The headset included voice recognition capabilities that allowed the user to dial telephone numbers, access a memory of stored numbers, and direct certain headset functions simply by spoken commands.

Therefore, there is a need to provide two-way asynchronous data communications in a portable device that can be entirely controlled by spoken commands and identification phrases.

SUMMARY OF THE INVENTION

The invention provides a method and apparatus for communicating audio messages using a two-way radio. An output audio message is asynchronously transmitted by generating a first acoustic signal in an input device of the radio. A determination is made whether the first acoustic signal is a command. If the acoustic signal is a command, then a response is generated in an output device, and the command is processed. Otherwise, the first acoustic signal is stored in an output buffer and then sent as an output audio message only when a communications channel is available.

An input audio message is asynchronously received in a receiver of the radio, and then stored in an input buffer. A second acoustic signal is generated which causes the stored input audio message to be sent to the output device only if the second acoustic signal is a play command.

DETAILED DESCRIPTION OF THE PREFERRED EMBODIMENT

System Components and Structure

External

Figure 1:
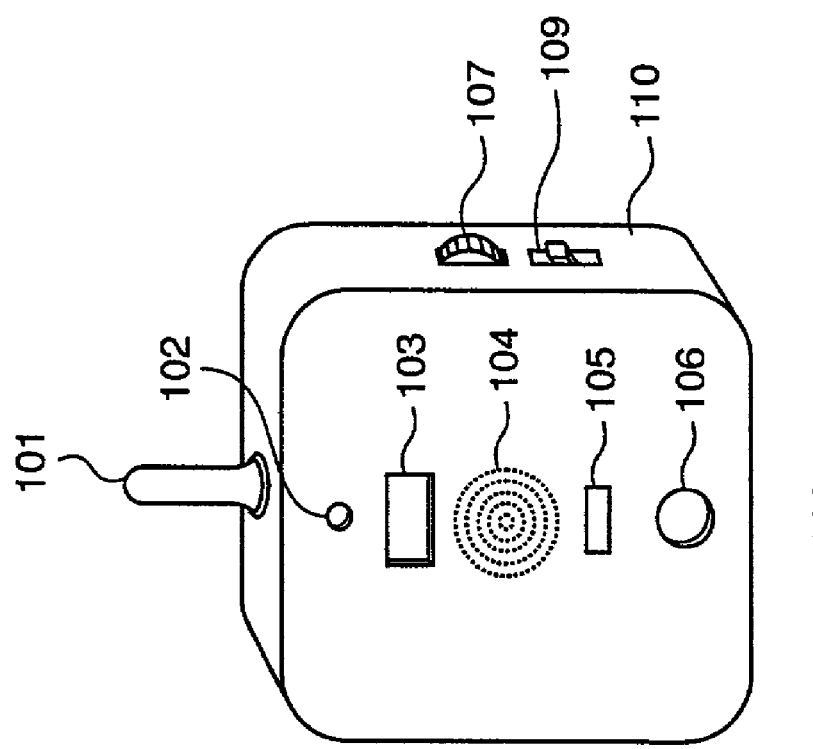
FIG. 1 is a view of a two-way asynchronous radio according to the invention.

As shown in FIG. 1, our two-way asynchronous radio 100 includes an antenna 101, an indicator light, e.g., a LED 102, a mechanical indicator (vibrator or ringer) 103, a speaker 104, an on/off switch 106 for a microphone 105, and a volume control 107 all mounted on a housing 110. The radio 100 can also include a multiple position select switch 109 to a select different modes of operation.

It should be noted, that the two-way radio according to the invention lacks the display and numerous buttons found in conventional two way communication devices such as cellular telephones.

Internal

Figure 2:
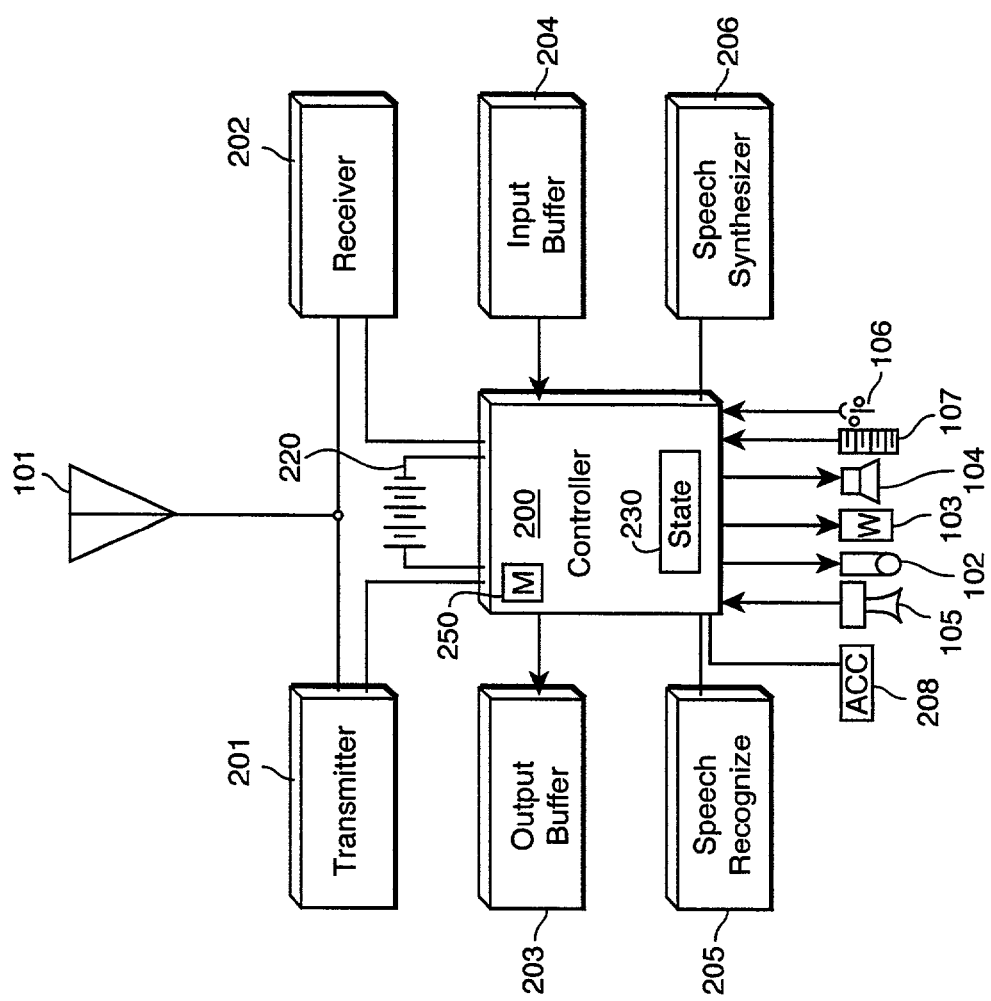
FIG. 2 is a block diagram of the radio of FIG. 1.

As shown in FIG. 2, the housing 110 also contains a transmitter 201, a receiver 202, an output buffer 204, a speech recognizer 205, a speech synthesizer 206 all coupled to a controller 200, and all operated by a battery supply 220. The controller can be a microprocessor that maintains state 230 of the radio. The controller 200 also includes local memory 250 to store programs, and user supplied data, described in greater detail below. For example, the state can indicate whether a spoken command or message is expected as a next input acoustic signal. The radio can also be equipped with accelerometers (ACC) 208.

System Operation

Transmitting

Figure 3:
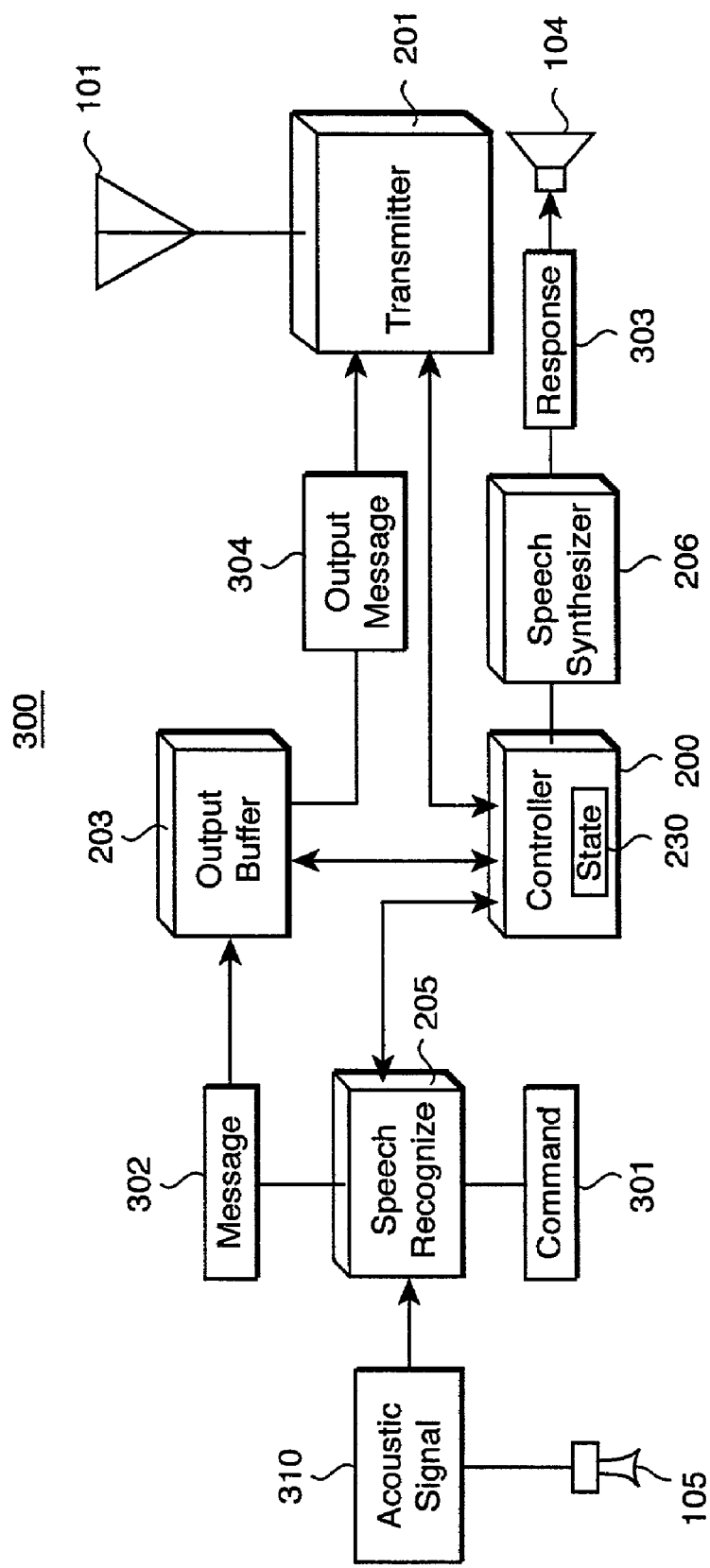
FIG. 3 is a flow diagram of transmitting audio messages by the radio of FIG. 1.

As shown in FIG. 3 for the operation of transmitting 300 output audio messages 302, a user speaks into the microphone 104 while pressing the switch 106 to generate a first acoustic signal 310. The user can supply either a voice command 301 or spoken message 302 by speaking into the microphone 105. These are translated to acoustic signals by the microphone 104. Acoustic signals are acquired and processed as long as the switch remains pressed. Releasing the switch terminates signal acquisition. The speech recognizer 205 and the state 230 determine whether the acoustic signal is a command or a message. If the signal is a command 301, then a response 303 to the command is generated by the speech synthesizer 206, and played on the speaker 104.

Alternatively, responses can be given via the light or mechanical indicator 102–103. If the radio is equipped with the accelerometer 108, then the user can move the radio 100 according to predetermined patterns to signal alternative commands. For example, vertical movements can indicate accord, and horizontal movements can mean cancellation.

Otherwise, if acoustic signal 310 is not a command, then the message 302 is stored in the output buffer 203, and the transmitter 201 sends the stored message as an output audio message 304 when a communications channel is available.

Receiving

Figure 4:
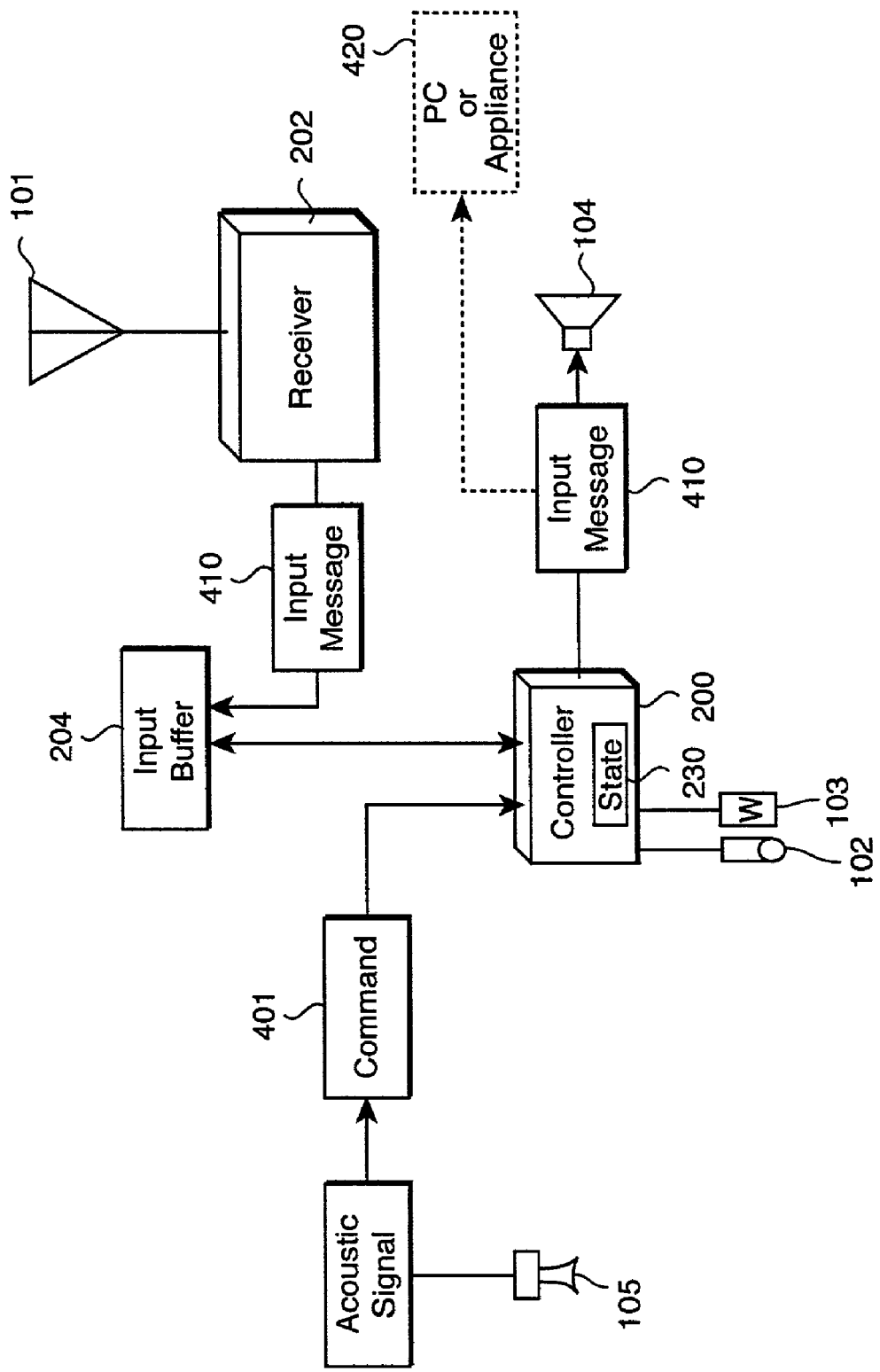
FIG. 4 is a flow diagram of receiving audio messages by the radio of FIG. 1.

As shown in FIG. 4 for the operation of receiving input audio messages 410. The input messages 410 are received by the receiver 202 and stored in the input buffer 204 when the communications channel is available. When an input message is received and stored, the light or mechanical indicators 102–103 can be activated. In this case, as above, the user speaks into the microphone 104 while depressing the switch 106 to supply voice commands 401, and an appropriate response is generated. The stored input message 410 is sent to the speaker 104 only if the command is a play command.

If the radio includes the select switch for different modes of operation, one mode may be "silent" mode where the light and mechanical indicators 102–103 are used for output signaling, and the accelerometers 208 is used for signaling commands, while the speaker plays messages at the lowest audible setting using the volume control 107. Cancellation can also be indicated by rapidly depressing the switch 106 a predetermined number of times.

Network

Figure 5:
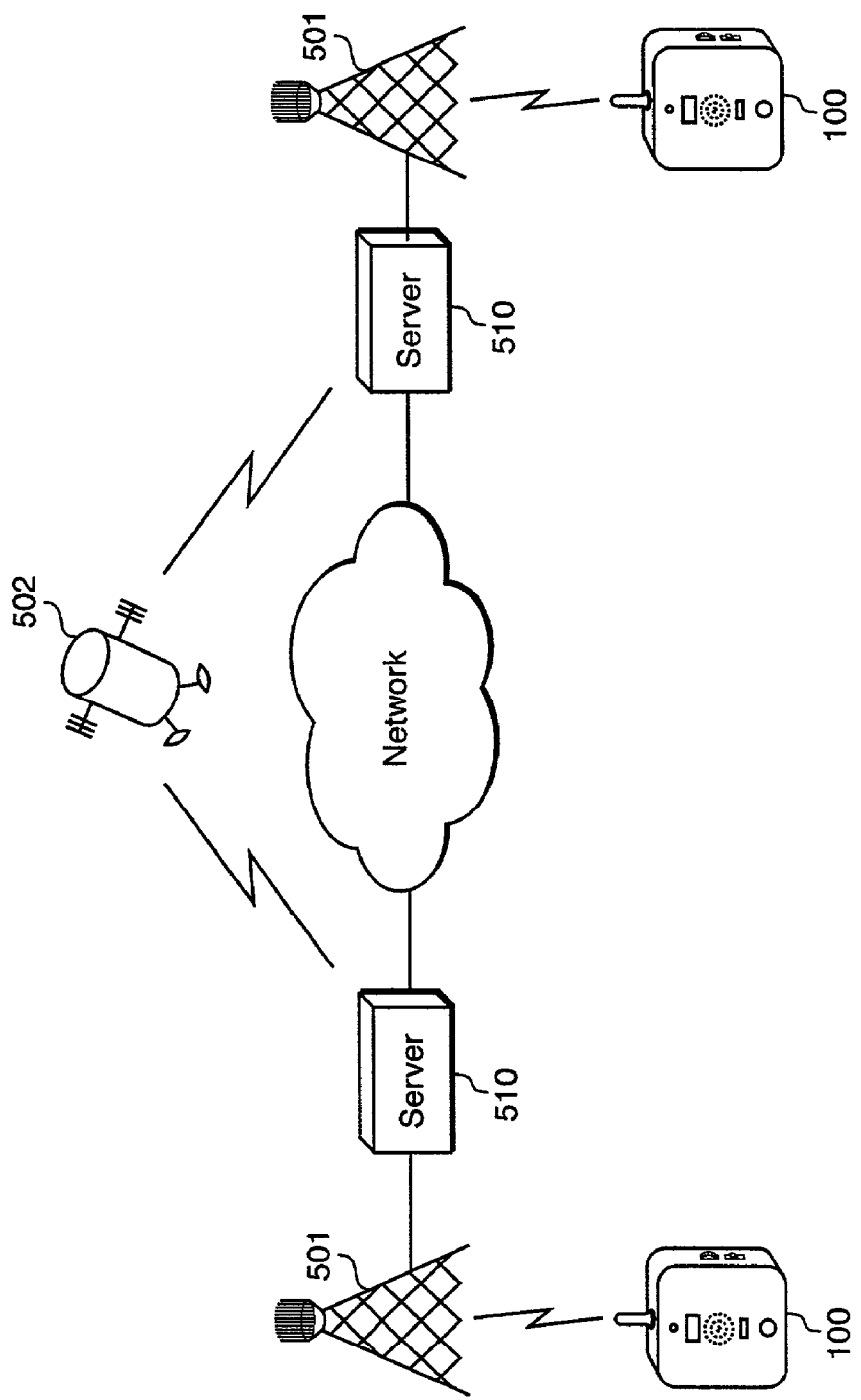
FIG. 5 is a block diagram of a packet-switched network use with radios according to the invention.

As shown in FIG. 5, messages can be transmitted and received over communications channels via basestations 501 or a satellite 502. In a practical embodiment, many users of the two-way radios 100 according to the invention concurrently communicate with each other using appropriate two-way wireless data communications technology, such as CDPD, GSM, GPRS, ReFLEX, 802.11b, and the like. The basestations 501 (or satellites) are connected to servers 510 operated by communications service providers.

The servers 510 act as a gateway, relaying messages to and from the radios 100, and storing messages until they can be received by the radios. The servers 510 are interconnected by a conventional wide area network 520, including the packet-switched Internet so that the radios 100 can communicate with Internet compatible devices. For example, in FIG. 4, the input message 410 can be sent to a PC or appliance 420.

Commands

Because the radio 100 is primarily voice operated, a number of commands can be defined as indicated below in Table A. The commands and definitions are self explanatory. The commands can be associated with modifiers, such as "first," "next," "new," "previous," "last." Note, these are only exemplary, other commands and modifiers can also be used. The key requirements is that the individual commands are intuitive, accurate, understandable, and distinguishable by the voice recognizer.

TABLE A

| Command | Definition |
| --- | --- |
| Call | Send a message |
| Play | Play selected message |
| Repeat | Repeat last command |
| Delete | Deleted selected message |
| Cancel | Cancel last command, and return to previous state |
| Detail | Provide details on selected message |
| Send | Send message to selected address |
| Status | Provided status on radio, battery, memory, etc. |
| Help | Provide help information according to current state |

Device Identification and Message Addresses

The two-way asynchronous radio according to the invention can use the following identification scheme to address messages. Three types of identification spaces are defined, physical, logical, and name space.

Each radio has a unique physical identification that is "factory" assigned and unalterable. In practice, the useable physical identification space is very large, e.g., >$10^{10}$, or larger.

Associated with each physical identification is a user assigned logical identification. The logical identification is specified by a spoken phrase that includes a predetermined number of word "slots," e.g., six slots. The words to fill the slots are selected from relatively small sets of unique words according to a vocabulary in a target language, e.g., there is a set of thirty-two word choices for each of the six slot in the phrase. Therefore, the number of different possible logical identifications is $32^6$. It should be understood, that larger identification spaces can be constructed by extending the size of the phrase or the size of the vocabulary, or both.

The user assigns the selected logical identification when the two-way radio is first used. At that time, the physical identification and logical identification can be stored in the memory 250 and transmitted to a common storage of a service provider for verification as to its uniqueness.

The order of the words in the phrase have a predetermined grammatical structure for the target language. For example, in the English language, the grammatical construction of the six words is:

number:adjective:noun:verb:preposition:proper-noun

Moreover, to make the words easier to remember and select in a particular language, they can be further constrained. For example, the nouns in example Table B below are animals, the adjectives colors, the verbs are past-tense and motion related, and the proper-nouns are cities.

TABLE B

| 1 | one | yellow | dogs | ran | over | Boston |
|---|-----|--------|------|-----|------|--------|
| 2 | two | green | snakes | flew | under | Beijing |
| 3 | three | white | horse | swam | around | Chicago |
| 4 | four | black | pandas | drove | through | Tokyo |
| ... | . | . | . | | | |

The selected words in the phrase can also be mapped to numeric identifiers, for example, the phrase "four green dogs flew through Boston," translates to "4.2.1.2.4.1." Therefore, on a universal basis, the same unique identifier can have different expressions of word orders and grammars in different target languages. Thus, it is possible, for the same physical identification, to have expressions as different logical identifications (spoken phrases) for users in different countries.

Each user can further associate a local name, e.g. "John," with each logical identification. This logical-name association is stored in a "phone-book" in the memory 250 of the controller. Then, the recognition of the logical phrases is only needed occasionally, e.g., when entering a logical names into the phonebook. Of course, different users can assign different local names to the same logical identification.

With this identification and addressing, a message can simply be sent by the command "Call John" which will asynchronously send a message to the two-way radio with a physical identification associated with the logical identification "4.2.1.2.4.1."

This identification scheme has a number of advantages over prior art numeric identifiers such as telephone numbers. First, the phrases are much simpler to remember while still providing a large number of possible identification numbers with a fairly small number of words in the phrase. Also, the phrase is more resistant to error, either by the user, or by the speech recognizer 205. It is well known that spoken telephone numbers are difficult to interpret correctly.

For example, a probability lattice can be used to correct or validate the output of the speech recognizer 205. To determine the probability that a particular acoustic signal represents a particular phrase the speech recognizer 205 can generate a probability lattice. The probability lattice for the phrase represents a determination of the probabilities for each possible state path for the sequence of words in the phrase. The probability lattice contains a node for each possible state that the speech recognizer 205 can be in for each word in the phrase. Each node contains the accumulated probability that the words processed so far will result in the recognizer being in the state associated with that node. The sum of the probabilities in the nodes for a particular phrase indicates the likelihood that the words processed so far represent a prefix portion of the phrase.

Figure 6:
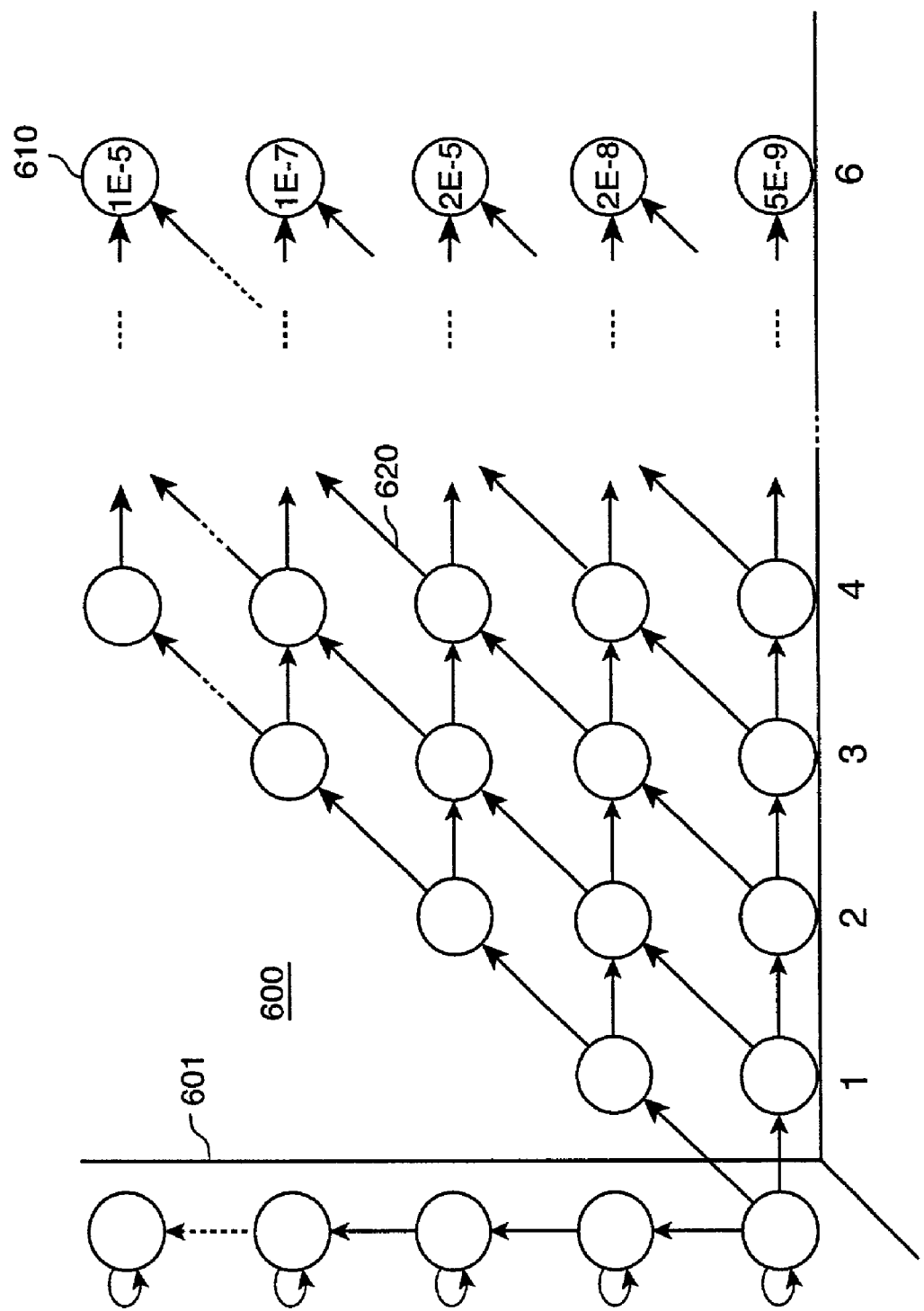
FIG. 6 is a graph of a probability lattice.

FIG. 6 illustrates a probability lattice 600 for a phrase. The vertical axis 601 corresponds to a concatenation of the states of the speech recognizer 205 for the words that compose the phrase. Node 610 represents a final state for the phrase and contains the maximum probability of all the state paths that lead to that node. The bolded lines of FIG. 6 represent the state path with the highest probability that ends at node 610. In certain applications, it is helpful to identify a number of possible state paths in order of their probabilities. One well-known process for identifying such a state paths is the well Viterbi algorithm.

The output of the above probability analysis can be used in two ways. First, the most probably phrase can be mapped to its numeral equivalent, and a forward error correction techniques can be applied to correct any errors. Alternatively, the n most probably phrases can be further analyzed, and the phrase that is most self constant according to redundancy information encoded in the phrase is selected as the correct phrase.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for communicating audio messages using a two-way radio, comprising:
    asynchronously transmitting an output audio message, the transmitting further comprising:
    generating a first acoustic signal in an input device of the radio;
    determining whether the first acoustic signal is a command, and if the first acoustic signal is a particular command, then responding to the particular command in an output device of the radio and processing the particular command, and otherwise storing the first acoustic signal in an output buffer of the radio and sending the first acoustic signal as an output audio message only when a communications channel is available to a transmitter of the radio; and asynchronously receiving an input audio message in a receiver of the radio, the receiving further comprising;

storing the input audio message in an input buffer of the radio;

generating a second acoustic signal in the input device;

sending the stored input audio message to the output device only if the second acoustic signal is a play command;

communicating input and output audio messages among a plurality of two-way radios via a wide area network, wherein each two-way radio has a unique physical identification, and an associated logical identification, and wherein each logical identification is in a form of a phrase having a predetermined words, the words arranged according to a predetermined grammatical structure for a particular target language.

2. The method of claim 1 wherein first and second acoustic signals are generated in a microphone, and the response is sent to a speaker.

3. The method of claim 1 further comprising:
activating an indicator when receiving the input audio message.

4. The method of claim 3 wherein the indicator is a light emitting diode.

5. The method of claim 3 wherein the indicator is a mechanical vibrator.

6. The method of claim 1 further comprising:
sensing movement of the two-way radio in an accelerometer to generate an alternative command.

7. The method of claim 1 further comprising:
selecting a silent mode of operation with a select switch.

8. The method of claim 1 further comprising:
storing the input and output audio messages in servers connected to the wide area network.

9. The method of claim 1 wherein the wide area network includes a packet switched network.

10. The method of claim 1 wherein the wide area network includes an Internet network.

11. The method of claim 1 wherein a particular physical identification and an associated particular logical identification map to a plurality of phrases for a plurality of target languages, each target language having particular predetermined words and particular grammatical structure for the particular target language.

12. The method of claim 1 wherein the responding further comprises:
synthesizing a response message.

13. The method of claim 1 wherein the output device is coupled to a user appliance.

* * * * *